United States Patent [19]
Tiedtke et al.

[11] Patent Number: 5,787,702
[45] Date of Patent: Aug. 4, 1998

[54] PROPULSION PLANT OPERATING ON THE BASIS OF CATALYTIC AND/OR CHEMICAL DECOMPOSITION OF A PROPELLANT

[75] Inventors: Peter Tiedtke; Josef Wiener, both of Bremen, Germany

[73] Assignee: Daimler-Benz Aerospace AG, Munich, Germany

[21] Appl. No.: 726,083

[22] Filed: Oct. 4, 1996

[51] Int. Cl.$^6$ .................................................. F02K 9/02
[52] U.S. Cl. ............... 60/39.462; 60/258; 60/257; 60/739
[58] Field of Search ................ 60/39.462, 257, 60/258, 723, 739, 39.06, 39.822

[56] References Cited

U.S. PATENT DOCUMENTS

| | | | |
|---|---|---|---|
| 2,977,755 | 4/1961 | Geckler et al. | 60/39.462 |
| 3,154,914 | 11/1964 | Stockel | 60/258 |
| 3,377,140 | 4/1968 | Hall | 60/258 |
| 3,446,023 | 5/1969 | Mosier et al. | 60/39.822 |
| 3,714,785 | 2/1973 | Iacobellis | 60/258 |
| 3,719,046 | 3/1973 | Sutherland et al. | 60/39.462 |
| 4,069,664 | 1/1978 | Ellion et al. | 60/39.462 |
| 4,499,735 | 2/1985 | Moore et al. | 60/739 |
| 5,161,379 | 11/1992 | Jones et al. | 60/258 |
| 5,568,723 | 10/1996 | Burke et al. | 60/39.462 |
| 5,647,201 | 7/1997 | Hook et al. | 60/258 |

FOREIGN PATENT DOCUMENTS

| | | |
|---|---|---|
| 4240962 | 4/1994 | Germany . |
| 0155067 | 6/1989 | Japan ................... 60/39.462 |

OTHER PUBLICATIONS

Monopropellant Hydrazine Propulsion Technology for Satellites Platforms Space Station Elements, MBB ERNO Space Systems Group Orbital Systems and Launcher Division, Sep., 1988 pp. 1–19.

*Primary Examiner*—Timothy S. Thorpe
*Assistant Examiner*—Ted Kim
*Attorney, Agent, or Firm*—W. G. Fasse; W. F. Fasse

[57] ABSTRACT

A propulsion plant operating on the basis of a catalytic and/or chemical decomposition of a liquid propellant, is equipped with a so-called aspirator ring (19) that covers the exit openings of the injection pipes (11), thereby screening these openings toward the decomposition chamber. The aspirator ring (19) is further enclosed by an aspirator screen (19A). The aspirator ring is constructed as a vaulted channel (20) in which the discharge bores (21) are arranged in a pattern that assures a uniform distribution of the propellant into the catalyst bed in the decomposition chamber. The aspirator screen (19A) is also formed with a channel and both the channel in the screen (19A) and the channel in the aspirator ring (19) preferably have a semicircular cross-section. The catalyst bed is divided into two separate beds so that the respective housing can also be divided so that subassemblies of the thruster may be built separately and then assembled. One subassembly includes the injection components and one catalyst bed in a first housing section (5) and the other subassembly includes a second catalyst bed in a respective housing section (6) and an expansion nozzle (13) connected to the second housing section (6).

20 Claims, 5 Drawing Sheets

PROPULSION PLANT OPERATING ON THE BASIS OF CATALYTIC AND/OR CHEMICAL DECOMPOSITION OF A PROPELLANT

FIELD OF THE INVENTION

The invention relates to a propulsion plant in which the energy carrier, referred to herein as propellant, is injected into a decomposition chamber holding a catalyst for a catalytic and/or chemical decomposition of the propellant.

1. Background Information

The propellant in such propulsion plants is particularly hydrazine which is injected through at least one injection pipe into the decomposition chamber. Normally, a plurality of pipes are arranged with their propellant discharging ends ending in a ring channel which has discharge openings leading into the decomposition chamber. These openings are covered through a screen or the like.

2. Field of the Invention

German Patent Publication 4,240,962 C1 (Ehrig), published on Apr. 7, 1994, discloses a propulsion plant using hydrazine as the liquid propellant. Such propulsion plants are used for various purposes in the space technology. Accordingly, such plants are produced in a wide range of thrust classes or output powers. In certain known propulsion plants the propellant, such as hydrazine is introduced into a decomposition chamber holding a catalyst bed, through a single injection head having a centrally positioned injection bore. Other propulsion plants of this type are equipped with an injection head having a multitude of injection bores for injecting the hydrazine into the decomposition chamber. The catalyst bed is usually formed of a multitude of individual granules of catalytically effective material or materials forming a filling or bed in the decomposition chamber.

Another publication entitled "Monopropellant Hydrazine Propulsion Technology", published by MBB Erno Space Systems Group of Bremen, Federal Republic of Germany, September 1988 illustrates several monopropellant hydrazine thrusters. Reference is especially made to Model CHT 350 on page 9 of the brochure. Such a thruster has the above mentioned structural features including a plurality of nozzle heads arranged in a baseplate and leading into a decomposition chamber in an undivided housing holding one or more aspirator screens.

Thrusters of the type described above leave room for improvement because they suffer from a thrust and power loss quite early in their operation due to damage to the catalyst bed. Such thrust and power loss has been observed, especially in thrusters that must undergo frequent cold starts. However, the problem also occurs in connection with continuous operation thrusters and pulse operation thrusters that are not subject to frequent cold starts. Commonly, these thrust and power losses are caused by the fact that the injected hydrazine is not uniformly, more specifically not optimally distributed onto the surface areas of the catalyst grains or globules. Such uneven hydrazine distribution causes an extremely high localized erosion loading of the catalyst bodies. As a result, the catalyst grains or bodies that receive very high hydrazine loads are destroyed, which in turn leads to a compaction of the catalyst bed. As a result, the pressure loss in the catalyst bed rises rapidly. Such pressure loss in turn leads to an unstable decomposition characteristic of the propulsion plant accompanied by a high power loss in all types of operation due to the just mentioned erosion effect.

In order to reduce or even avoid the erosion effect, the catalyst bed has been protected or screened by one or more layers of wire mesh screen, whereby a direct impact of the hydrazine jet on the catalyst bodies or grains is prevented or at least substantially reduced. Such screens are referred to as aspirator screens.

OBJECTS OF THE INVENTION

In view of the above it is the aim of the invention to achieve the following objects singly or in combination:

to avoid or even eliminate the above mentioned thrust and power losses due to the described erosion effect;

to provide a thruster of the type described which has a higher output power by more efficiently using the catalyst;

to construct the thruster and its components in such a way that it has a better reliability while allowing its manufacture at reduced costs; and to optimally expose the catalyst bodies to the propellant while simultaneously avoiding an over exposure and thus avoiding the erosion effect;

to construct the thruster components in such a way that their simplicity assures a high precision even if the manufacturing steps must be repeated often;

to assure the required power output characteristic without an early power loss; and to divide the thruster into a plurality of subassemblies that can be manufactured independently of one another and which can then be easily combined.

SUMMARY OF THE INVENTION

A propulsion plant according to the invention is characterized in that the ends of injection pipes for the propellant end in a ring channel having a vaulted, preferably semicircular cross-section, and a multitude of propellant discharge bores passing through the vaulted ring for permitting propellant to travel from the jet pipes through the vaulted ring into the catalyst bed in a uniform distribution of propellant onto the catalyst globules.

The discharge bores in the vault of the vaulted ring channel are symmetrically distributed in the surface of the ring channel, whereby a so-called aspirator ring is formed that can be manufactured as a separate component of the thruster. Thus, the thruster can be manufactured by simple means, yet with a high, consistently repeatable precision which also applies to its uniform power output characteristic over its expected active life.

The propellant discharge openings through the vaulted ring channel are preferably distributed along a plurality of concentric reference circles of which there are preferably at least three. This construction makes it possible to determine by the manufacture of the vaulted ring channel, the injection characteristic in such a way that an optimal impingement or contact of the catalyst bed by the propellant is achieved and that an undesirable concentration of propellant in the hollow space between the injection pipes and the following filter screens is avoided. It has been found that the vaulted shape of the propellant aspirator ring causes a substantial quieting of the turbulent flow of the incoming propellant. An optimal quieting and a uniform distribution of the propellant onto the catalyst bed is achieved in the preferred embodiment of the invention in which the aspirator ring and an aspirator screen separating the aspirator ring from the catalyst bed, have the same or at least approximately the same vaulting configuration, however with different radii.

An especially important advantage of the invention is achieved with regard to its manufacturing by separating the thruster, or rather the components of the thruster into at least two subassemblies that can be manufactured independently of each other and then easily assembled with each other. According to the invention one subassembly comprises a first housing section, the injection components, and a first catalyst bed downstream of the injection components as viewed in the flow direction of the propellant. The second subassembly comprises a second housing section, a second catalyst bed followed by the expansion nozzle. In this manner it has been possible to substantially reduce manufacturing times and to achieve substantial savings in the manufacturing costs while still achieving the required high precision, and facilitating the filling of the catalyst globules into the housing sections.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Generally, the thrusters according to the invention operate on the basis of a catalytical and/or chemical decomposition of a liquid propellant, such as hydrazine, making the present thrusters especially suitable for space technology, for example in the position control of satellites and in orbital stations.

Figure 1:
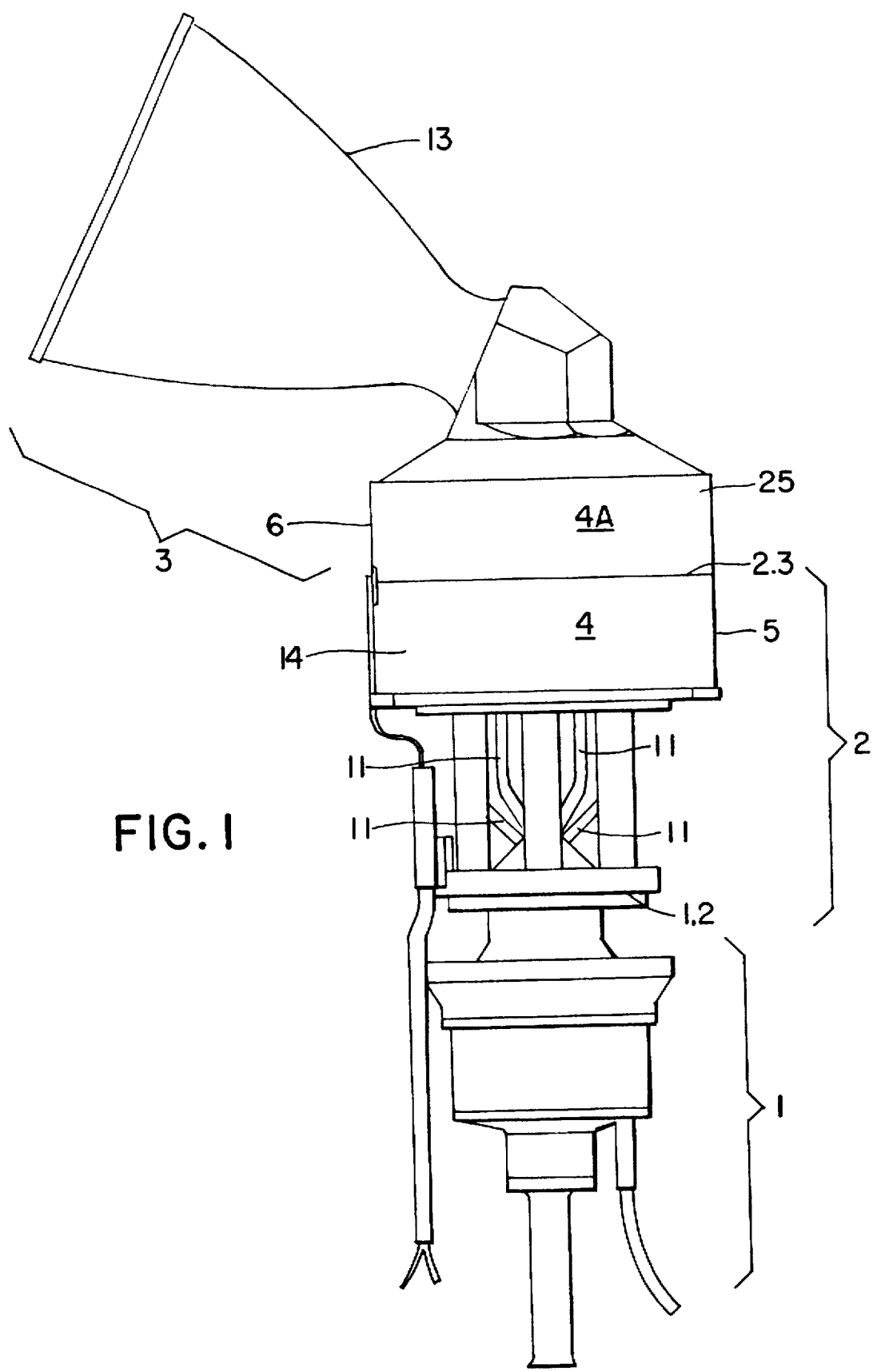
FIG. 1 is a side view of a thruster according to the invention divided into three subassemblies that can be manufactured independently of each other.

FIG. 1 shows the basic construction of a thruster according to the invention divided into three subassemblies, namely an injection valve assembly 1 for supplying the liquid propellant to the thruster, an injection pipe and partial catalyst bed section 2, and a third subassembly 3 comprising a second catalyst bed section and an expansion nozzle. All three sections may be easily manufactured separately and combined along clear interface planes 1.2 and 2.3. The subassembly 2 comprises a pipe section with injection pipes 11 and a first bed section 4 in a first housing section 5 enclosing a decomposition chamber section 14. The third subassembly 3 comprises a second catalyst bed section 4A in a second housing section 6 enclosing a decomposition chamber section 25 and an expansion nozzle 13 secured to the housing section 6. The two bed sections 4 and 4A are arranged in the respective housing sections 5 and 6. The housing sections 5 and 6, when assembled, form a common however subdivided reaction chamber 14, 25.

Figure 2:
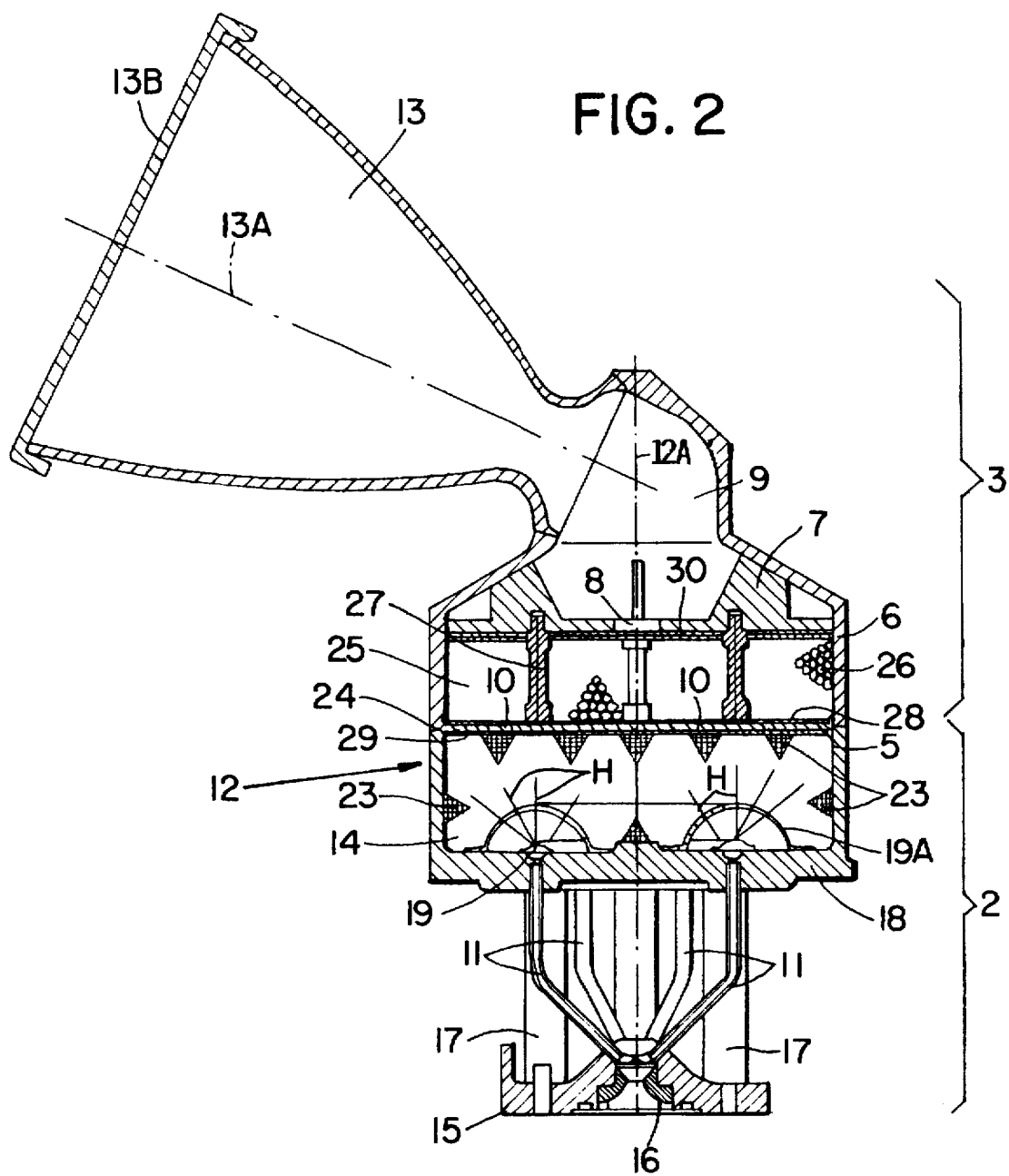
FIG. 2 is an axial sectional view through two subassemblies of the thruster according to FIG. 1.

FIG. 2 shows a sectional view through the second subassembly 2 and the third subassembly 3. The housing sections 5 and 6 form together a housing 12 that encloses the two decomposition or reaction chamber sections 14 and 25. The first subassembly 1 of the propellant injection valve is not shown in FIG. 2. The expansion nozzle 13 is mounted to the second housing section 6 and extends with its central axis 13A at an angle to the longitudinal axis 12A of the housing 12. The propellant is transported from the subassembly 1 through a plurality of injection pipes 11, for example six such pipes, into the first reaction chamber section 14 that is part of a two chambered reaction space enclosed by the housing 12. The other reaction chamber section 25 is also enclosed by the housing 12. A flange 15 provides base to which the injection valve 1 is mounted as more clearly shown in FIG. 3. An entrance shutter 16 is mounted in the flange 15. A head plate 18 also referred to as base plate is secured to the flange 15 by spacer rods 17 angularly spaced around the central axis 12A and secured to the flange 15. Where six injection pipes 11 are used it is preferable that six spacer rods 17 are used to connect the flange 15 to the head plate 18 which forms the bottom of housing section 5.

The upper ends of the pipes 11 pass through-bores 18A arranged in a circle in the head plate 18. According to the invention the circle of through-bores in the head plate 18 is covered by a specially shaped vaulted ring 19 that faces with its open ring vault 20 toward the open ends of the pipes 11. The hydrazine is uniformly distributed into the first reaction chamber section 14 as indicated by the lines H radiating from the aspirator ring 19 and from an aspirator screen 19A covering the vaulted ring 19.

A first catalyst bed 23 is arranged in the first decomposition chamber section 14. The catalyst comprises, for example a multitude of individual grains or ball-shaped carrier globules made of an aluminum oxide ceramic material ($Al_2O_3$) doped or coated by a dopant such as iridium (Ir) present to the extent of 33 to 35% by weight of the total catalyst. A second catalyst body or bed 26 is arranged in the second decomposition chamber section 25 which is separated from the first chamber by a perforated intermediate plate 24. The second catalyst bed 26 differs from the first bed 23 in that the dopant is different. In the second bed 26 the grains or ball-shaped globules forming the catalyst carrier are also of aluminum oxide ceramic material. However, the dopant is a mixture of about 16% by weight of iridium with the remainder being ruthenium (Ru) forming the remainder by weight of the dopant. This dopant mixture provides a very economical catalyst filling for the second reaction or decomposition chamber 25, whereby the second bed 26 fills the space in the chamber 25 entirely, except for the space taken up by spacer columns 27. The spacer columns 27 are arranged between the intermediate plate 24 and a housing insert 7 provided with apertures 8 leading into an expansion chamber 9 to which the expansion nozzle 13 is connected. Apertures 10 in the intermediate plate 24 are covered by screens 28 and 29 to keep the catalyst grains or globules in the respective chamber 14 and 25. Similarly, a screen or screens 30 cover the apertures 8 in the housing insert 7 for keeping the grains or globules in the chamber 25.

Figure 3:
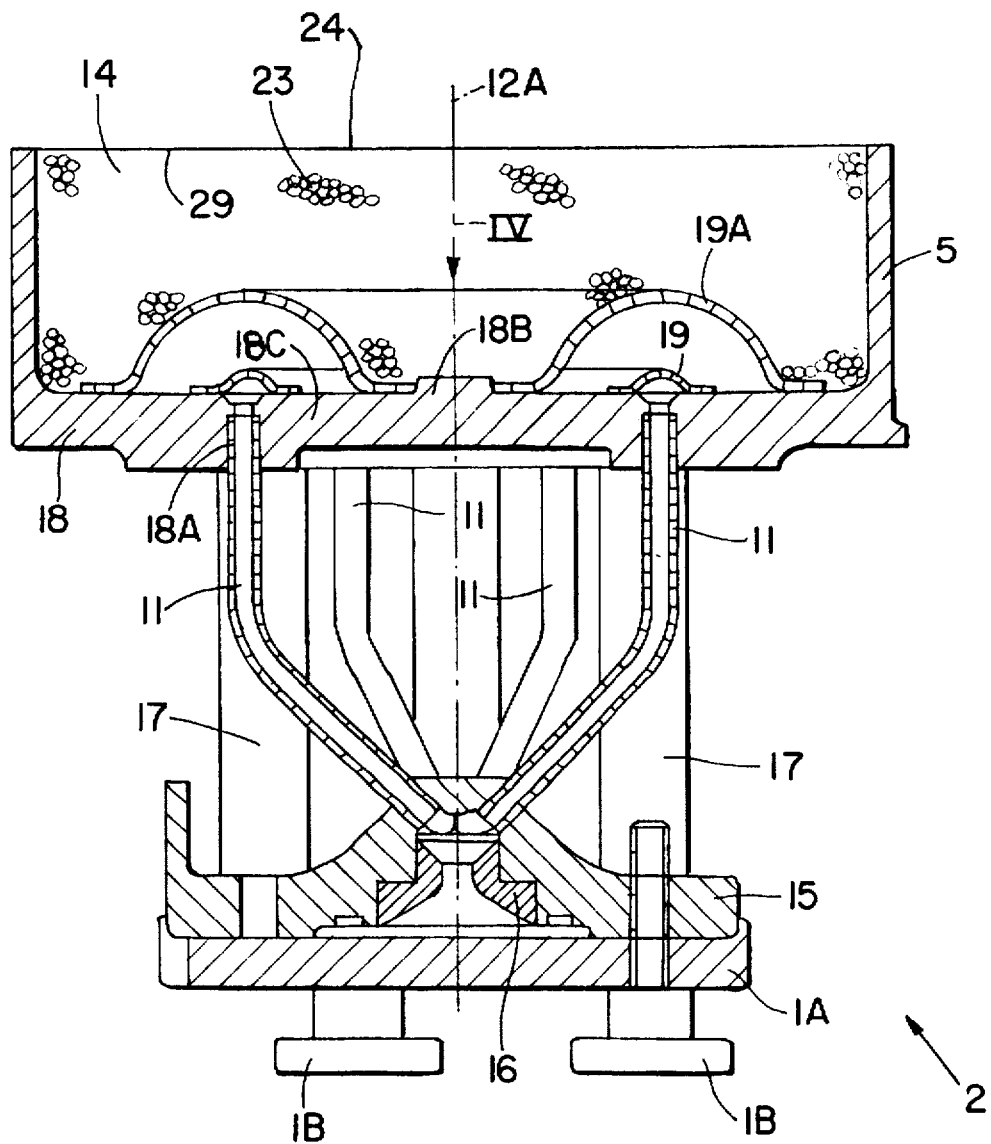
FIG. 3 is a sectional view as in FIG. 2 on an enlarged scale and showing only the propellant injection section and the first catalyst bed subassembly.

FIG. 3 illustrates on an enlarged scale the details of the second subassembly 2. The separation from the first subassembly 1 is easily accomplished by a flange 1A fitting onto the flange 15 of the second subassembly 2 and connected thereto through manually operable screws 1B. The head plate 18, or rather its upwardly facing surface, is provided with a centering stub 18B for centering the aspirator screen 19A relative to the vaulted aspirator ring 19 which in turn is centered against a centering shoulder 18C on the top surface of the head plate 18. Thus, a uniform distribution of the propellant through the vaulted aspirator ring 19 and through the vaulted aspirator screen 19A is assured. Both, the vaulted ring 19 and the screen 19A are secured to the head plate 18, for example by soldering, brazing, welding, or the like.

Figure 4:
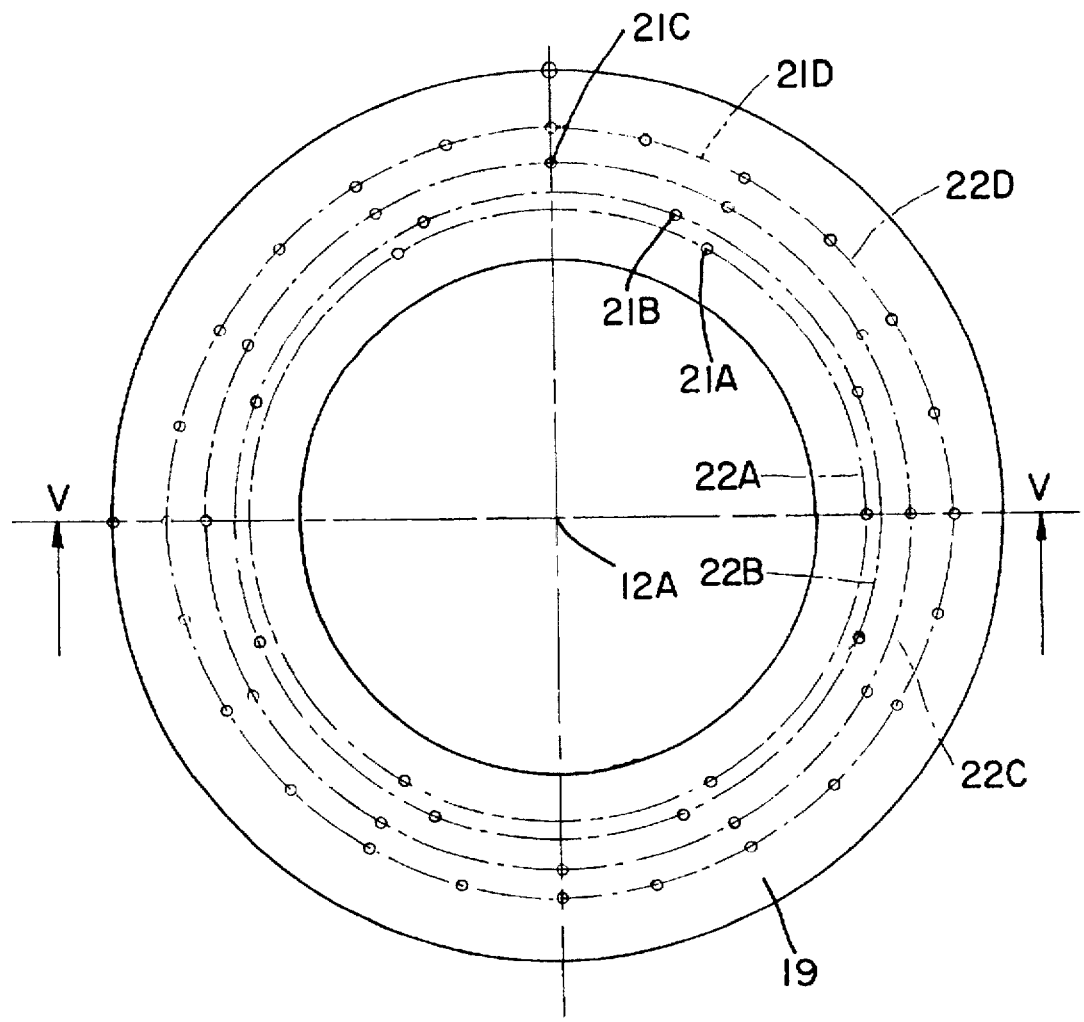
FIG. 4 is a plan view, in the direction of the arrow IV in FIG. 3 illustrating the aspirator ring of the invention.
Figure 5:
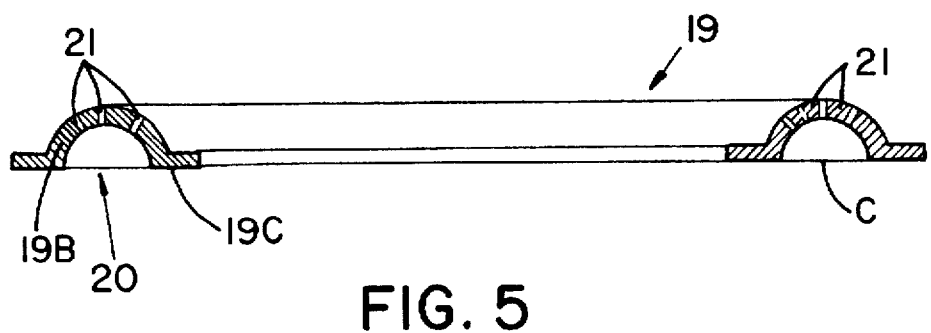
FIG. 5 is a sectional view along section line V—V in FIG. 4 illustrating the vaulted construction of the present aspirator ring or ring channel.

FIGS. 4 and 5 illustrate the construction details of the vaulted aspirator ring 19 which has a vaulted wall 19B that forms the above mentioned channel vault or trough 20 preferably having a semicircular cross-section as best seen in FIG. 5. The wall 19B of the ring 19 is provided with through-bores 21 specially distributed according to the invention to assure a uniform and fine distribution of the propellant entering the trough 20 and passing through the bores 21 into the first reaction chamber 14 after passing through the aspirator screen 19A. Preferably, the bores 21 have longitudinal axes that extend radially relative to a center circle C of the vault 20. The wall 19B forms a radially inwardly extending flange 19C that centers the aspirator ring 19 on the shoulder 18B seen in FIGS. 3 and 6. Referring specifically to FIG. 4, the apertures 21 are arranged on four reference circles 22A, 22B, 22C, and 22D in such a way that the number of apertures increases radially outwardly. Thus, the number of apertures 21A on the innermost reference circle 22A corresponds, for example, to the number of injection pipes which in this embodiment is six. The reference circle 22B has eight apertures 21B. The reference circle 22C has twelve apertures 21C. The radially outermost reference circle 22D has 24 apertures 21D. This distribution of the apertures 21 results in a radiating distribution H of the propellant as shown in FIG. 2.

The above described subassemblies 1, 2, and 3 can be completely built individually and then assembled to form the thruster, whereby prior to the final assembly, the reaction spaces 14 and 25 are easily filled through the openings provided at the interface prior to the insertion of the dividing plate 24. Once one chamber is filled the dividing plate 24 is attached to the respective housing section 5 or 6 and that section may then be attached to the other section without catalyst bodies falling out of the respective chamber.

Figure 6:
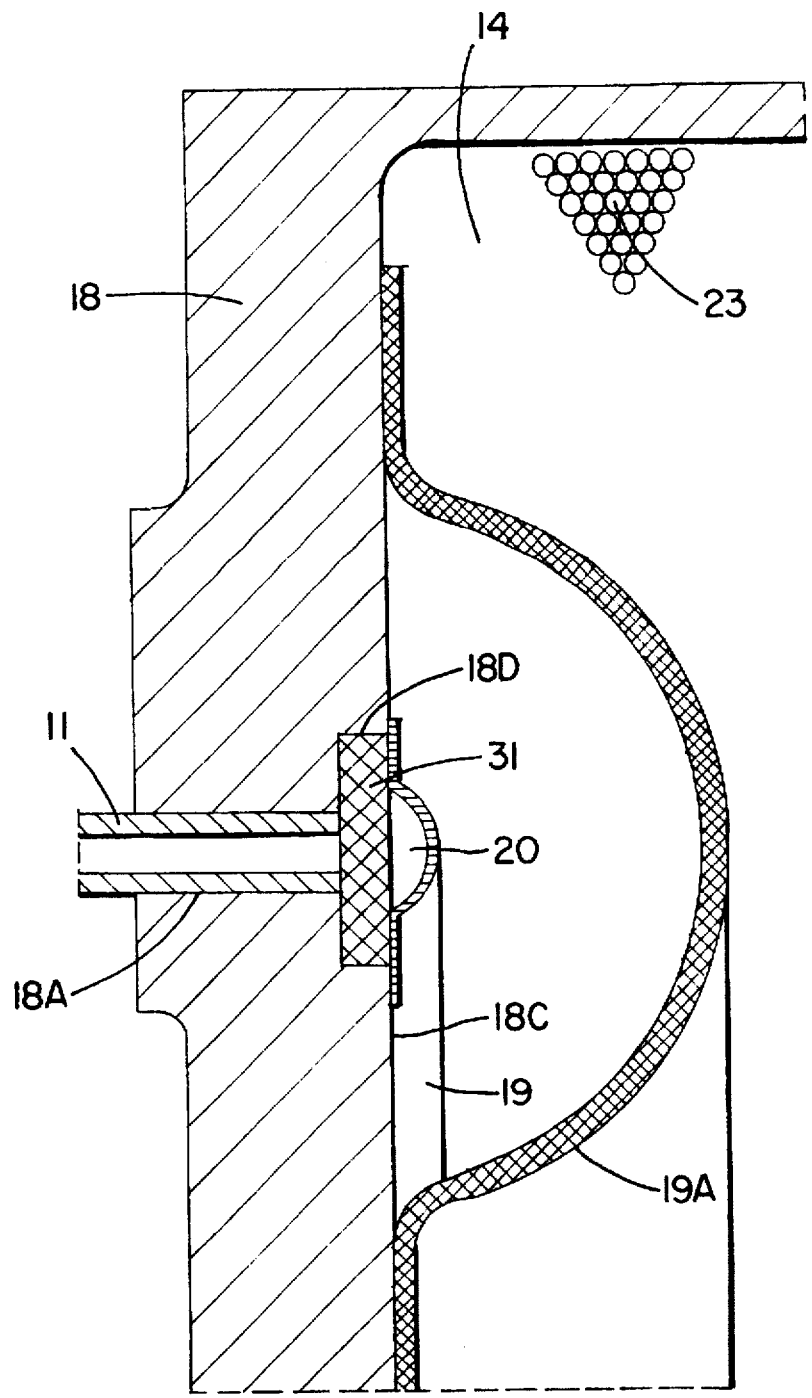
FIG. 6 shows the present vaulted aspirator ring, on an enlarged scale, covered by an aspirator screen having the same semicircular vaulting, however with a larger radius.

FIG. 6 shows the arrangement of the vaulted aspirator ring 19 and of the vaulted aspirator screen 19A relative to each other in greater detail, whereby the centering of the two rings relative to each other and relative to the head plate 18 is achieved as described above for a uniform hydrazine distribution. Both the vaulted aspirator ring 19 and the vaulted ring screen 19A have the same semicircular vaulting but with different radii.

Further, FIG. 6 shows a filter 31 preferably inserted in a recess 18D of the head plate 18 between the exit end of the respective injection pipe 11 and the trough or vault 20 of the aspirator ring 19 to prevent dust that could be generated, from entering into the propellant. Such dust may be generated during the loading of the reaction chamber 14 with the catalyst bed 23 and during the subsequent final testing and qualification vibration testing. During these tests mechanical friction between the aspiration screen 19A and the individual catalyst grains or balls in the bed 23 generate dust by abrasion. This is referred to as aspiration dust. Without a filter it is difficult to prevent this dust from entering into the injection pipes 11 through the aspirator ring 19 and thus into the injection and control valve of the subassembly 1. Dust in these areas or components can cause a leak in the valve seat. In order to avoid the consequent problems of such leaks which could damage the function of the entire thruster, the filter or screen 31 is positioned as described in order to keep any aspiration dust away from the injection components of the thruster.

The hydrazine ($N_2H_4$) passing through the filter 31, the vaulted aspirator ring 19 and through the screen 19A decomposes when it contacts the catalyst bed 23 thereby generating heat. The decomposition results in gaseous components substantially comprising nitrogen ($N_2$), ammonia ($NH_3$), and hydrogen ($H_2$). The reaction gases travel with the still not decomposed hydrazine into the second reaction chamber 25 where the contact with the second catalyst bed 26 results in the complete decomposition. The resulting gases now pass through the upper screen 30 and the apertures 8 into the chamber 9 and from there into the expansion nozzle 13, whereby the available high pressure generates the desired thrust by which the protection cover 13B is removed.

Although the invention has been described with reference to specific example embodiments, it will be appreciated that it is intended to cover all modifications and equivalents within the scope of the appended claims.

What is claimed is:

1. A propulsion plant for operating on the basis of catalytic and/or chemical decomposition of a liquid fuel, comprising a housing (12), a decomposition chamber (14, 25) in said housing (12), for holding a catalyst (23, 26), injection pipes (11) for injecting said liquid fuel into said decomposition chamber, a vaulted aspirator ring (19) forming a ring vault (20) having a plurality of exit openings (21) leading into said decomposition chamber, said injection pipes (11) leading into said ring vault (20), said vaulted ring (19) comprising a wall having a substantially semicircular cross-section forming said ring vault (20) wherein said plurality of exit openings (21) are formed as through-bores (21A, 21B, ...) passing through said substantially semicircular wall.

2. The propulsion plant of claim 1, further comprising a perforated aspirator screen (19A) enclosing said vaulted ring (19) between said vaulted ring and said decomposition chamber (14, 25).

3. The propulsion plant of claim 2, wherein said perforated aspirator screen (19A) also has an approximately semicircular cross-section to enclose said vaulted ring (19).

4. The propulsion plant of claim 1, wherein said through-bores (21A, ...) of said vaulted ring (19) are positioned on at least three different reference circles (22A, 22B, ...) on said vaulted ring (19).

5. The propulsion plant of claim 4, wherein numbers of said through-bores (21A, 21B, ...) on said reference circles differ from each other on different reference circles (22A, 22B, ...).

6. The propulsion plant of claim 4, wherein said numbers of said through-bores (21A, 21B, ...) differ from each other on different reference circles, said numbers increasing from an inner smaller diameter reference circle (22A) to an outer larger diameter reference circle (22D).

7. The propulsion plant of claim 2, wherein said aspirator screen (19A) comprises at least one layer of wire mesh for separating said vaulted ring (19) from said decomposition chamber for holding a catalyst.

8. The propulsion plant of claim 7, wherein said wire mesh is formed as a ring-shaped vaulted screen (19A).

9. The propulsion plant of claim 8, wherein said ring-shaped vaulted screen (19A) has a substantially semicircular cross-section to form a vault having an open base facing toward said vaulted ring (19) and a vaulting having an open face facing said vaulted ring (19) and extending in a propellant flow direction.

10. The propulsion plant of claim 1, further comprising a filter (31) arranged between an injection pipe exit and said ring (19).

11. The propulsion plant of claim 1, further comprising a first catalyst bed (23) and a second catalyst bed (26) arranged in series with each other as viewed in a propellant flow direction.

12. The propulsion plant of claim 11, wherein said catalyst beds form first and second catalyst layers (23, 26) with a catalyst arranged in one layer differently from a catalyst arrangement in the other layer.

13. The propulsion plant of claim 12, wherein at least one catalyst layer (26) of said first and second catalyst layers comprises catalyst carrier bodies of aluminum oxide ceramic ($Al_2O_3$) and a catalyst coating of iridium (Ir) and ruthenium (Ru) on said carrier bodies, said coating containing said iridium and said ruthenium in approximately equal proportions.

14. The propulsion plant of claim 13, wherein each proportion of said iridium and ruthenium proportions, corresponds to about 16% by weight of said catalyst carrier bodies and catalyst coating.

15. The propulsion plant of claim 14, wherein the other (23) of said first and second catalyst layers comprises carrier bodies of aluminum ceramic coated with iridium.

16. The propulsion plant of claim 13, wherein said at least one catalyst layer (26) comprising said carrier bodies coated with iridium and ruthenium, is located further away from said injection pipes than the other catalyst layer (23).

17. The propulsion plant of claim 16, wherein said decomposition chamber in said housing (12) comprises two decomposition chamber sections (14, 25) arranged axially next to each other in series in a propellant flow direction.

18. The propulsion plant of claim 17, wherein said housing (12) is divided into a first housing section (5) and a second housing section (6).

19. The propulsion plant of claim 18, further comprising a housing head plate (18) with through-bores (18A) for said injection pipes (11), and wherein said first housing section (5) with said other catalyst layer (23) in said first reaction chamber (14) and said housing head plate (18) form a first subassembly of said propulsion plant.

20. The propulsion plant of claim 19, further comprising an expansion nozzle (13) forming with said second reaction chamber (24) holding said at least one catalyst layer (26) and said second housing section (6) form a second subassembly of said propulsion plant.

* * * * *